United States Patent
Kim et al.

(10) Patent No.: US 9,729,928 B2
(45) Date of Patent: Aug. 8, 2017

(54) APPARATUS AND METHOD FOR PROCESSING AUDIO, METHOD FOR SETTING INITIALIZATION MODE, AND COMPUTER-READABLE RECORDING MEDIUM

(71) Applicant: SAMSUNG ELECTRONICS CO., LTD., Suwon-si (KR)

(72) Inventors: Myoung-ho Kim, Suwon-si (KR); Byeong-hu Lee, Hwaseong-si (KR); Jong-jik Lee, Suwon-si (KR); Sang-deok Kim, Suwon-si (KR); Yong-hee Park, Suwon-si (KR); Dana Jung, Busan (KR); Taek-gyun Kim, Suwon-si (KR); Sang-rae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/321,974

(22) Filed: Jul. 2, 2014

(65) Prior Publication Data
US 2015/0074729 A1 Mar. 12, 2015

(30) Foreign Application Priority Data
Sep. 12, 2013 (KR) .................. 10-2013-0109856

(51) Int. Cl.
*H04N 7/18* (2006.01)
*H04N 21/458* (2011.01)
(Continued)

(52) U.S. Cl.
CPC ......... *H04N 21/4586* (2013.01); *H04N 19/56* (2014.11); *H04N 21/4302* (2013.01);
(Continued)

(58) Field of Classification Search
CPC .......... H04N 21/4586; H04N 21/4302; H04N 21/43635; H04N 21/44227; H04N 21/4432
(Continued)

(56) References Cited

U.S. PATENT DOCUMENTS

| 8,175,298 B2* | 5/2012 | Mitani et al. ................. 381/123 |
| 8,201,211 B2* | 6/2012 | Proust ................... G06F 21/575 707/999.203 |

(Continued)

FOREIGN PATENT DOCUMENTS

| JP | 2012-151700 | 12/2010 |
| JP | 2010-283560 | 8/2012 |

OTHER PUBLICATIONS

PCT International Search Report and Written Opinion of the International Searching Authority mailed Nov. 13, 2014 in corresponding International Patent Application No. PCT/KR2014/006586.
(Continued)

*Primary Examiner* — Michael B Pierorazio
(74) *Attorney, Agent, or Firm* — Staas & Halsey LLP

(57) ABSTRACT

Provided herein is an audio processing apparatus including: a controller configured to determine an initialization mode for processing video and audio signals provided from an audio provision apparatus of among a plurality of initialization modes, and to perform an initialization process differently according to the result of determination; and an audio processor configured to process the audio signal and output the processed audio signal, when the initialization process is performed.

27 Claims, 7 Drawing Sheets

(51) Int. Cl.
  *H04N 21/43*    (2011.01)
  *H04N 21/4363*  (2011.01)
  *H04N 21/442*   (2011.01)
  *H04N 21/443*   (2011.01)
  *H04N 19/56*    (2014.01)

(52) U.S. Cl.
  CPC ... *H04N 21/43635* (2013.01); *H04N 21/4432* (2013.01); *H04N 21/44227* (2013.01)

(58) Field of Classification Search
  USPC .......................................................... 725/80
  See application file for complete search history.

(56) References Cited

U.S. PATENT DOCUMENTS

| | | | | |
|---|---|---|---|---|
| 8,351,624 | B2* | 1/2013 | Motomura | 381/123 |
| 2006/0089735 | A1 | 4/2006 | Atkinson | |
| 2007/0046835 | A1 | 3/2007 | Kim et al. | |
| 2008/0063216 | A1* | 3/2008 | Sakata et al. | 381/80 |
| 2008/0320545 | A1 | 12/2008 | Schwartz | |
| 2010/0149433 | A1 | 6/2010 | Jang et al. | |
| 2010/0315553 | A1* | 12/2010 | Takatsuji | G06F 21/10 |
| | | | | 348/516 |
| 2010/0321479 | A1* | 12/2010 | Yang | 348/51 |
| 2011/0051002 | A1* | 3/2011 | Oh | 348/569 |
| 2011/0068736 | A1* | 3/2011 | Chartier et al. | 320/107 |
| 2011/0134338 | A1* | 6/2011 | Toba | 348/734 |
| 2011/0142245 | A1* | 6/2011 | Toba et al. | 381/22 |
| 2011/0176057 | A1* | 7/2011 | Okamura et al. | 348/554 |
| 2011/0234916 | A1* | 9/2011 | Fujita et al. | 348/738 |
| 2012/0002562 | A1* | 1/2012 | Kawade | 370/252 |
| 2012/0042346 | A1 | 2/2012 | Yoshida et al. | |
| 2012/0136612 | A1* | 5/2012 | Vanderhoff et al. | 702/119 |
| 2012/0188456 | A1* | 7/2012 | Kuroyanagi | 348/569 |
| 2012/0307157 | A1* | 12/2012 | Utsunomiya | H04N 5/775 |
| | | | | 348/707 |
| 2013/0021536 | A1 | 1/2013 | Kamida | |
| 2013/0051578 | A1* | 2/2013 | Chu et al. | 381/94.1 |
| 2013/0051584 | A1* | 2/2013 | Higuchi | H04N 21/4122 |
| | | | | 381/123 |
| 2014/0193134 | A1* | 7/2014 | Maeda et al. | 386/231 |
| 2015/0077633 | A1* | 3/2015 | Lee et al. | 348/515 |

OTHER PUBLICATIONS https://ko.wikipedia.org/wiki/%EA%B3%A0%EC%84%A0%EB%AA%85_%EB%A9%80%ED%8B%B0%EB%AF%B8%EB%94%94%EC%96%B4_%EC%9D%B8%ED%84%B0%ED%8E%98%EC%9D%B4%EC%8A%A4.
http://www.siliconimage.com/solutions/ip/hdmi14-rx/.
Mexican Office Action dated Jan. 30, 2017 in Mexican Application No. MX/a/2016/000334.

* cited by examiner

APPARATUS AND METHOD FOR PROCESSING AUDIO, METHOD FOR SETTING INITIALIZATION MODE, AND COMPUTER-READABLE RECORDING MEDIUM

CROSS-REFERENCE TO RELATED APPLICATIONS

This application claims priority benefit from Korean Patent Application No. 10-2013-0109856, filed in the Korean Intellectual Property Office on Sep. 12, 2013, the disclosure of which is incorporated herein by reference.

BACKGROUND

1. Field

Methods and apparatuses consistent with the exemplary embodiments relate to an apparatus and method for processing audio, a method for setting an initialization mode, and a computer-readable recording medium, more particularly, to an apparatus and method for quickly outputting audio provided from an image display apparatus or an audio equipment such as a home heater etc., and a method for setting an initialization mode and computer-readable recording medium thereof.

2. Description of the Related Art

In general, a home theater refers to a system for household use wherein image signals of movies may be input as Videocassette Recorder (VCR) or TV broadcast signals via a speaker of multi-channels so as to provide the user with the sensation as if he/she is in a theater. More and more households are buying home theaters since users can feel the sensation as if he/she is watching a movie in a theater.

More specifically, such a home theater system provides a function of receiving digital signals via an High Definition Multimedia Interface (HDMI) Audio Return Channel (ARC)) or optical/coaxial cable, and decoding the input digital signals through a decoder, and outputting the decoded digital signals to a speaker. In this process, the point where the HDMI Consumer Electronics Control (CEC) function is prepared for receiving audio data through a ARC is operable in an ARC mode at the point where the actual operation can be performed after a main CPU is booted.

However, when a conventional home theater system is turned on, it takes a long time to receive digital audio signal via an ARC or optical/coaxial cable, decode and output the digital audio signal, which is a problem. This delays the time of the initialization process of the main CPU and decoder of the home theater system and of recognizing the CEC module and input mode, thereby delaying the time where audio is output to a speaker.

SUMMARY

Additional aspects and/or advantages will be set forth in part in the description which follows and, in part, will be apparent from the description, or may be learned by practice of the invention.

Aspects of the present disclosure are to provide an apparatus and method for processing audio, a method for setting an initialization mode, and a computer-readable recording medium, more particularly, to an apparatus and method for quickly outputting audio signal provided from an image display apparatus or an audio equipment such as a home theater etc., and a method for setting an initialization mode and computer-readable recording medium thereof.

According to an exemplary embodiment of the present disclosure, an audio processing apparatus including: a controller configured to determine an initialization mode for processing a video and audio signal provided from an audio provision apparatus or audio signal providing apparatus of among a plurality of initialization modes, and to perform an initialization process differently according to a result of determination; and an audio processor configured to process the audio signal and output the processed audio signal, when the initialization process is performed.

The controller may determine the initialization mode as being one of normal modes where the video signal is processed prior to the audio signal and an abnormal mode where the audio signal is processed prior to the video signal, and perform an initialization process corresponding to the determined initialization mode.

The abnormal mode may include an HDMI ARC mode for receiving an input of the audio signal from the audio provision apparatus through a HDMI Audio Return Channel (ARC) and an optical/coaxial input mode for receiving an input of the audio signal from the audio provision apparatus through an optical/coaxial cable.

The controller may include a first controller configured to set the initialization mode according to a user's request; and a second controller configured to perform an initialization process corresponding to the set initialization mode.

The first controller may set the initialization mode to a normal mode for processing the video signal prior to the audio signal when there exists a video processing history of the audio processing apparatus.

The first controller may set the initialization mode to an HDMI ARC mode or optical/coaxial input mode for processing the audio signal prior to the video signal according to whether or not there is a response after inquiring about a signal mode of the audio signal to the audio provision apparatus, when there exists a user's request.

The first controller and the second controller may be connected through a General Purpose Input/Output (GPIO) terminal, and the first controller may control the GPIO terminal to set the initialization mode to one of the HDMI ARC mode and optical/coaxial input mode.

The first controller may apply power to the second controller and the audio processor together with controlling the GPIO terminal.

The audio processor may include a decoder for decoding the audio signal; and a signal transceiver for receiving the audio signal from the audio provision apparatus wherein the signal transceiver may include a first connector configured to receive an audio signal of the audio provision apparatus through an HDMI ARC; and a second connector configured to receive an audio signal of the audio provision apparatus through an optical/coaxial cable.

According to an exemplary embodiment of the present disclosure, there is provided an audio processing method of an audio processing apparatus, the method including: determining an initialization mode for processing a video and audio signal provided from the audio provision apparatus of among a plurality of initialization modes, and performing an initialization process differently according a result of determination; and processing the audio signal and outputting the processed audio signal when the initialization process is performed.

The determining an initialization mode may involve determining as one of a normal mode where the video signal is processed prior to the audio signal and an abnormal mode where the audio signal is processed prior to the video signal.

The abnormal mode may include an HDMI ARC mode for receiving an input of the audio signal from the audio provision apparatus through a HDMI Audio Return Channel (ARC) and an optical/coaxial input mode for receiving an input of the audio signal from the audio provision apparatus through an optical/coaxial cable.

The performing an initialization process differently may include setting, by a first controller, an initialization mode according to a user's request; and performing, by a second controller, an initialization process corresponding to the set initialization mode.

The setting an initialization mode may involve setting the initialization mode to a normal mode for processing the video signal prior to the audio signal, when there exists a video processing history with the first controller turned on.

The setting an initialization mode may include inquiring about the signal mode of the audio signal to the audio provision apparatus at the user's request; and setting the initialization mode to an HDMI ARC mode or optical/coaxial input mode for processing the audio signal prior to the video signal according to whether or not there is a response to the inquiry.

The first controller and the second controller may be connected through a General Purpose Input/Output (GPIO) terminal, and the setting an initialization mode may involve controlling the GPIO terminal by the first controller to set the initialization mode to one of a normal mode, an HDMI ARC mode, and an optical/coaxial input mode.

The performing an initialization process differently may involve checking a condition of control of the GPIO terminal and determining the initialization mode.

The performing an initialization process differently may include controlling so that power is applied to the second controller and audio processor together with controlling the GPIO terminal.

According to an exemplary embodiment of the present disclosure, there is provided a method for setting an initialization mode, the method including: starting an operation at a user's request; determining whether or not there exists at least one of a video processing history and user's request; inquiring about a signal mode of the audio signal to the audio provision apparatus, if there is a user's request for using the audio signal; and setting an initialization mode according to a response, if there is a response to the inquiry from the audio provision apparatus.

There may be further provided setting the initialization mode to a normal mode for processing the video signal prior to the audio signal, if there exists a video processing history.

The setting the initialization mode may include distinguishing between an Audio Return Channel (HDMI ARC) mode for processing the audio signal prior to the video signal or an optical/coaxial input mode according to whether or not there is a response to the inquiry; and setting the initialization mode according to the result of distinguishing.

The initialization mode may involve controlling a General Purpose Input/Output (GPIO) terminal to set the initialization mode to one of a normal mode, an HDMI ARC mode, and optical/coaxial input mode.

According to an exemplary embodiment of the present disclosure, there is provided a computer-readable recording medium for executing a method for setting an initialization mode of an audio processing apparatus, the recording medium executing: determining whether or not there exists at least one of a video processing history and user's request; and inquiring about a signal mode of the audio signal to the audio provision apparatus, if there is a user's request for using an audio signal; and setting an initialization mode according to a response, if there is a response to the inquiry from the audio provision apparatus.

According to the aforementioned various exemplary embodiments of the present disclosure, there may be provided an audio processing apparatus and method for processing an audio signal in various ways.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
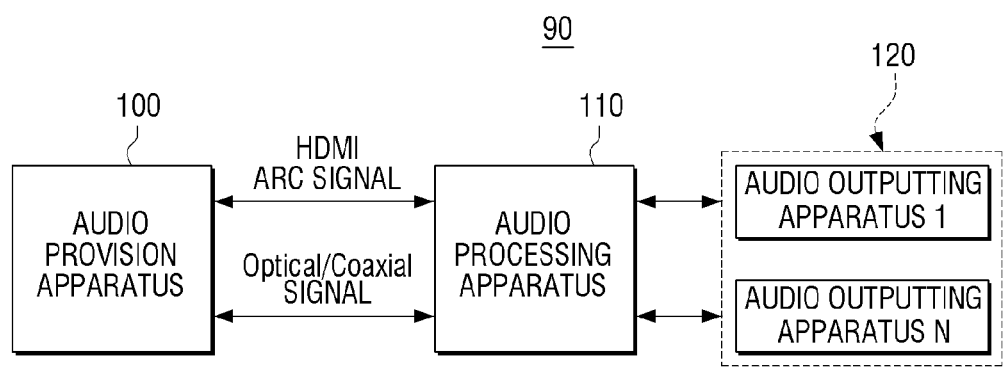
FIG. 1 is a view illustrating an audio processing system according to an exemplary embodiment of the present disclosure.

Reference will now be made in detail to the embodiments, examples of which are illustrated in the accompanying drawings, wherein like reference numerals refer to the like elements throughout. The embodiments are described below to explain the present invention by referring to the figures.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating an audio processing system according to an exemplary embodiment of the present disclosure.

As illustrated in FIG. 1, an audio processing system 90 according to an exemplary embodiment of the present disclosure includes a part or entirety of an audio signal providing apparatus or audio provision apparatus 100, audio processing apparatus 110, and audio outputting apparatus 120.

Herein, to include a part or entirety of an audio provision apparatus 100, audio processing apparatus 110, and audio outputting apparatus 120 means some configurative elements such as the audio processing apparatus 110 being integrated into other configurative elements such as the audio provision apparatus 100, or some configurative elements such as the audio outputting apparatus 120 being omittable. But for better understanding of the present invention, the descriptions are made based on the assumption that it includes an entirety of an audio provision apparatus 100, audio processing apparatus 110, and audio outputting apparatus 120.

Furthermore, the audio processing system 90 may be integrated into a video processing system as well, although not described as such herein for better understanding. Accordingly, the audio provision apparatus may be an image provision apparatus, and the audio processing apparatus may be an image processing apparatus, wherein the image processing apparatus may be divided into an audio processor and video processor.

Based on the above, an input image signal may be separated into audio signal and video signal, decoded and scaled, and then output after synchronizing the video signal and audio signal. Therefore, the image processing apparatus according to an exemplary embodiment of the present disclosure may include a demux, audio and video decoder, and scaler etc.

The meaning of an audio provision apparatus 100 may refer to an apparatus such as an image display apparatus where images are displayed on a screen such as a TV, notebook, and mobile phone, but it may also refer to an audio equipment such as MP3 etc. which enables listening to audio only. It may also mean a recording apparatus such as a DVD or VCR. When signal processing by an HDMI is possible, such an audio provision apparatus 100 provides audio signals to the audio processing apparatus 110, that is audio signals reproduced by a user's request through an HDMI ARC, but in the case of an S/PDIF interface for transmitting data of an audio CD directly in digital format, the audio provision apparatus 100 may send the audio signals to the audio processing apparatus 110 using an optical/coaxial cable.

Furthermore, when the audio provision apparatus 100 receives an inquiry of a signal mode, that is the type of signal from the audio processing apparatus 110, it may perform a responding procedure, or not respond to the inquiry. For example, the audio processing apparatus 110 which had been turned off being turned on at a user's request may be construed as the user wanting to listen to the audio of the audio provision apparatus 100 through the audio processing apparatus 110, in which case the audio processing apparatus 110 may make an inquiry to the audio provision apparatus 100 about what kind of signal the received audio signal is. For example, when asked whether the audio signal transmitted from the audio processing apparatus 110 to the audio provision apparatus 100 is an ARC signal or a signal using an optical/coaxial cable, the audio provision apparatus 100 may make the audio processing apparatus 110 determine the signal mode by not providing an response. For example, in the case where the audio processing apparatus 110 inquired whether or not the audio signal is an ARC signal and the audio provision apparatus 100 did not provide a particular response, the audio processing apparatus 110 may determine that the audio signal is a signal using an optical/coaxial cable.

The audio processing apparatus 110 may refer to for example, a home theater. When the audio processing apparatus 110 which had been turned off is turned on at a user's request, the audio processing apparatus 110 may perform an initialization process differently according to the previous condition of the audio processing apparatus 110, or the type of signal of the audio signal provided from the audio provision apparatus 100 that is operating. For example, when it is determined that the input audio signal is an audio signal corresponding to the HDMI ARC mode, the audio processing apparatus 110 may perform an initialization process corresponding to an HDMI ARC mode, and when it is determined that the input audio signal is an optical/coaxial mode, the audio processing apparatus 110 may perform an initialization process corresponding to the optical/coaxial mode. Otherwise, the audio processing apparatus 110 may perform an initialization process in a normal mode. Herein, the initialization process involves adjusting the initializing order of the configurative elements inside according to the normal mode, HDMI ARC and optical/coaxial mode. By the adjustment of such an initializing order, it is possible to process video first in the case of a normal mode, and process audio first in the case of an ARC mode. Of course, by the adjustment of the initializing order, the initialization time may be shortened the most in the normal mode, next in the HDMI ARC mode, and then in the optical/coaxial mode.

For example, if the audio processing apparatus 110 according to an exemplary embodiment of the present disclosure is dualised into a CPU for controlling the configurative elements that form the audio processing apparatus 110 and a microcomputer (MICOM) or a controller for managing the power of the configurative elements etc., the aforementioned functions may be performed separately. As will be explained in more detail herein below, if the MICOM determines an input audio signal and sets information per mode that is GPIO, the CPU may read information per set mode, perform an initialization process corresponding to each mode, process the input audio signal and output the processed audio signal.

The audio outputting apparatus 120 may include a plurality of speakers. Assuming that the audio provision apparatus 100 is an image display apparatus, the audio outputting apparatus 120 may output each voice of the persons displayed on the screen of the image display apparatus or output sound effect according to the audio processing of the audio processing apparatus 110. For example, by outputting the voice of a person on the right side of the screen of the image display apparatus and the voice of a person on the left side of the screen through speakers at appropriate locations, it is possible to maximize the sound effect.

Consequently, an audio processing apparatus 110 according to an exemplary embodiment of the present disclosure may not only satisfy the listening sensation of a user but also quickly react to the user's requests and satisfy the user's needs. This is expected to increase product demand.

Figure 2:
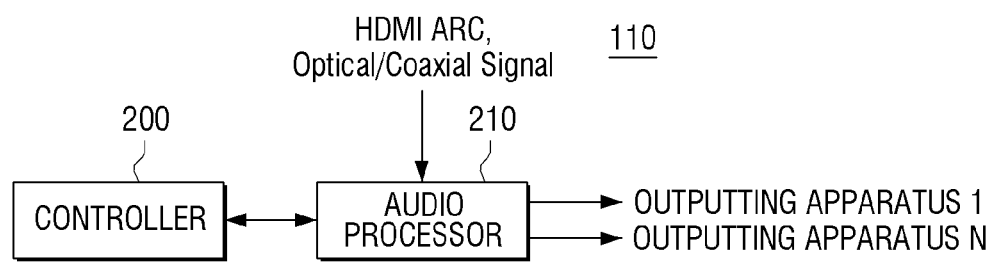
FIG. 2 is a block diagram illustrating a structure of an audio processing apparatus of FIG. 1 according to a first exemplary embodiment of the present disclosure.

FIG. 2 is a block diagram illustrating a structure of an audio processing apparatus of FIG. 1 according to an exemplary embodiment of the present disclosure.

With reference to FIGS. 1 and 2, the audio processing apparatus 110 according to a first exemplary embodiment of the present disclosure includes a part or entirety of a controller 200 and audio processor 210, and may also further include a part of entirety of a power supply (not illustrated) and storage (not illustrated).

Herein, to include a part or entirety of a controller 200 and audio processor 120 means that a controller 200 and audio processor 210 may be integrated into a module format, but for better understanding of the present invention, the descriptions are made based on the assumption that it includes an entirety of the controller 200 and audio processor 120. However, although the audio processor 210 may operate independently from the video processor, it may be construed as including the video processor. For example, the audio and video processor may be called an image processor.

The controller 200 determines an initialization mode for processing the audio signal provided from the audio provision apparatus 100 of FIG. 1 and performs an initialization process differently according to the result of determination. More specifically, the controller may be turned on by the user's request, wherein the controller 200 may determine whether the audio processing apparatus 110 had been turned off and then turned on again in a normal mode or the user provided a particular key input such as a sound key for requesting an abnormal mode (or non-abnormal) such as an ARC mode and optical/coaxial mode. In the former case, the audio processing apparatus 110 may determine the initialization mode as a normal mode and perform an initialization process corresponding to the normal mode. In the latter case, the controller 200 may inquire the audio provision apparatus 100 about the type of the audio signal, distinguish between an ARC mode and optical/coaxial mode as an abnormal mode depending on the response to the inquiry, and perform an initialization process corresponding to each mode. For example, if there is no response to the inquiry whether it is an audio signal by ARC, the controller 200 may determine it as an optical/coaxial mode and perform an initialization process accordingly. After performing the initialization, the controller 200 may control the application of power to the audio processor 120. Meanwhile, the controller 200 may execute an algorithm stored in a recording medium in a format of a recording medium, and perform the aforementioned operations.

The audio processor 210 may receive power from a power supply (not illustrated) outside under the control of the controller 200, and after booting, that is performing an initialization process, the audio processor 210 may process the audio signal provided to a particular path and output the processed audio signal. In this process, if the input audio signal is provided after it is compressed, the audio processor 210 may decompress the compressed audio signal, convert the digital audio signal into an analogue signal, and output the converted audio signal. In addition, the audio processor 210 may separate the audio signal input into the audio processor 210 into audio signals of multi channels, and output the separated audio signals.

The power supply may receive commercial power from outside, and convert the power into voltage necessary in the controller 200 and audio processor 210, while the storage may store a program for an initialization process, that is, booting, and then execute a booting program at the request by the controller 200.

Figure 3:
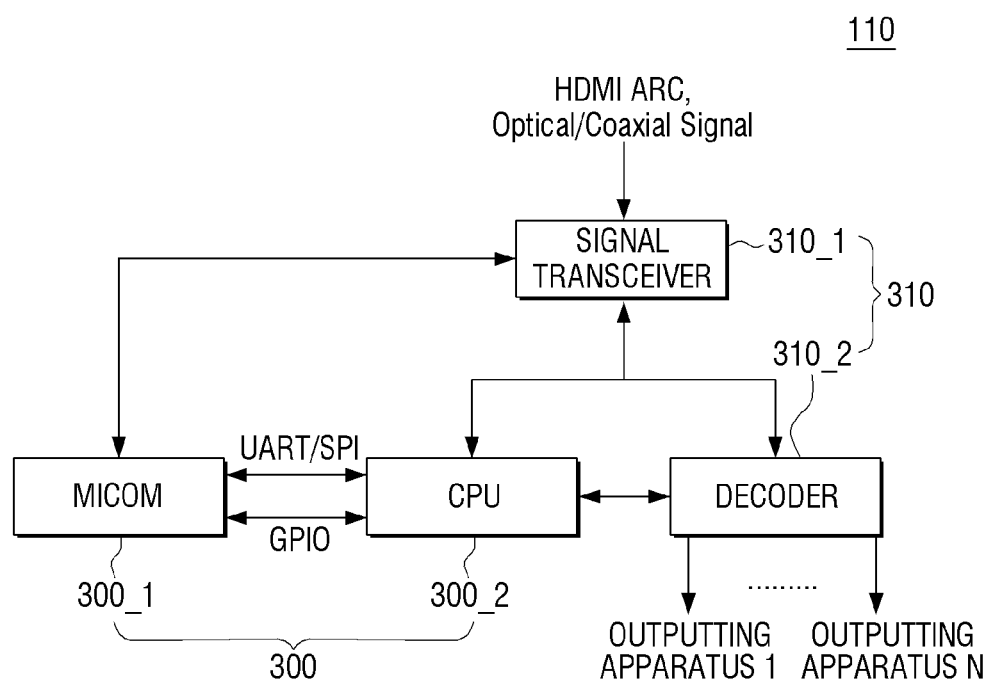
FIG. 3 is a block diagram illustrating a structure of an audio processing apparatus of FIG. 1 according to a second exemplary embodiment of the present disclosure.

FIG. 3 is a block diagram illustrating a structure of an audio processing apparatus of FIG. 1 according to a second exemplary embodiment of the present disclosure.

With reference to FIG. 1 and FIG. 3, an audio processing apparatus 110 according to a second exemplary embodiment of the present disclosure comprises a part or entirety of a MICOM 300_1 (or first controller), a CPU 300_2 (or second controller), a signal transceiver 310_1 and a decoder 310_2, and may further include a part or entirety of a power supply (not illustrated) and a storage (not illustrated).

Herein, MICOM 300_1 and CPU 300_2 form the controller 300, and the signal transceiver 310_1 and the decoder 310_2 form the audio processor 310. In addition, the signal transceiver 310_1 may include an HDMI transceiver for transceiving HDMI signals and an optical signal transceiver for transceiving optical cable signals, and the decoder 310_2 may include a video and audio decoder. Furthermore, to include a part or entirety of something means the same as mentioned above, but for better understanding of the present invention, the descriptions are made based on the assumption that it comprises an entirety of the above.

The MICOM 300_1 may control the power applied to the CPU 300_2 and/or decoder 310_2. In addition, when turned on at the user's request, the MICOM 300_1 may request an ARC initialization according to a CEC setting when requesting for power by inputting of a particular key or a CEC, and if there is reaction to this command, sets an initialization mode information that CPU 300_2 can read, that is a GPIO. Herein, the MICOM 300_1 sets the GPIO setting value according to the value promised with the CPU 300_2, and then turns on the CPU 300_2. Herein, the particular key input (or user request) may be a power application key or a TV sound key etc. Furthermore, setting of the GPIO is operations of turning on/off two pins, and accordingly it is possible to express four conditions: High, High; High, Low; Low, High; Low, Low.

In order to set an initialization mode, a MICOM 300_1 may determine whether the audio processing apparatus 110 had been turned off and then turned on again in a previous general mode condition, or the user provided an input of a particular key such as a sound key for requesting the ARC mode and optical/coaxial mode.

In the former case, MICOM 300_1 sets the initialization mode such that the CPU 300_2 performs an initialization process in a normal mode. In the latter case, the MICOM 300_1 inquires about the type of signal to the audio provision apparatus 100 and sets the appropriate GPIO according to the result of response. For example, if the MICOM 300_1 inquired whether it is an ARC signal, and there is a response from the audio provision apparatus 100, it is possible to set an initialization mode for performing an initialization process to an ARC mode, whereas if there is no response from the audio provision apparatus 100, it is possible to set an initialization mode for performing an initialization process to an optical/coaxial mode. The MICOM 300_1 provides the initialization mode set in this method to the CPU 300_2 while enabling the power to be applied to the CPU 300_2 and the decoder 310_2 at the same time.

When power is applied, the CPU 300_2 initializes what is necessary for driving the system, and then checks the initialization mode information provided from the MICOM 300_1, that is a GPIO, and adjusts the initializing order according to each mode, so as to support quick audio output during the initialization process by an ARC or an optical/coaxial mode. In other words, when an initialization process by ARC or optical/coaxial mode is performed, audio is processed and output in advance compared to the video.

To this end, for example, the CPU 300_2 may check whether or not the initialization mode is an ARC mode, distinguish an ARC mode, and if it is not an ARC mode, the CPU 300_2 may check whether or not the initialization mode is an optical/coaxial mode and distinguish between the optical/coaxial mode and normal mode. According to such a process, the CPU 300_2 may perform a different initialization process. Herein, a different initialization process is adjusting the initializing order of the CPU 300_2 itself, or the signal transceiver 310_1 and MPEG decoder etc. according to which the total time of initialization may change.

For example, in an ARC mode, the CPU 300_2 is initialized, the audio processor inside the decoder 310_2 is initialized, and then the HDMI receiver (Rx) (or the first connector) inside the signal transceiver is initialized. Furthermore, in an optical/coaxial mode, the CPU 300_2 is initialized similarly as in the ARC mode, but an optical cable, that is, an optical/coaxial receiver (Rx)(or the second connector) may be initialized instead of the HDMI Rx. On the other hand, in the case of a normal mode, the CPU 300_2 may be initialized, the video processor inside the decoder 310_2 may be initialized, and then all blocks inside the signal transceiver 310_1 may be initialized. This is just an example, and thus there is no limitation to the above description in the present disclosure.

The signal transceiver 310_1 may include a first connector to which the HDMI ARC is connected and a second connector to which the optical/coaxial cable is connected. In addition, the signal transceiver 310_1 may output the input audio signal to one of the MICOM 300_1, CPU 300_2 and decoder 310_2, and may transceive data regarding inquiry and answer between the MICOM 300_1 and the audio provision apparatus 100.

In the case where the input audio signal is provided after it is compressed, the decoder 310_2 may decompress the compressed audio signal, or perform a function of converting the input digital audio signal into an analogue audio signal and outputting the converted audio signal. Herein, the decoder 310_2 may output the audio signal to multi channel paths according to the control of the CPU 300_2.

Figure 4:
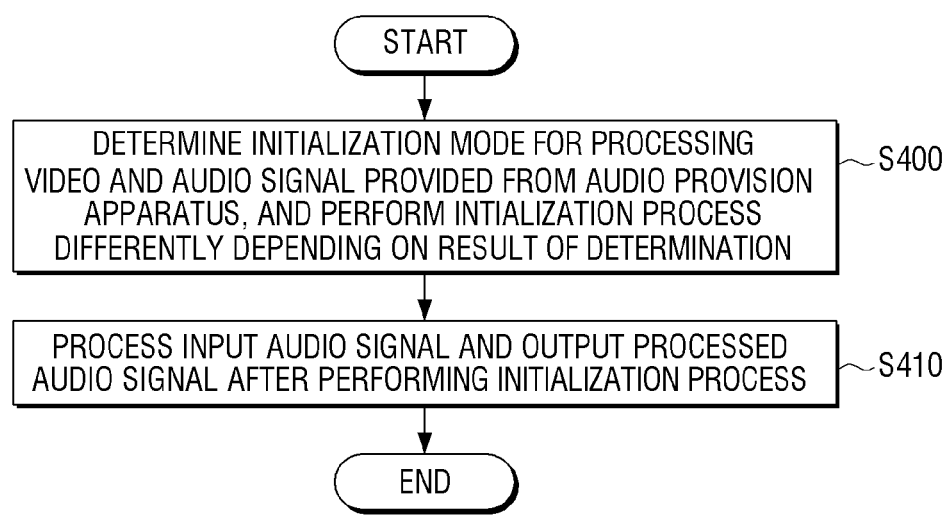
FIG. 4 is a view illustrating an audio processing method according to a first exemplary embodiment of the present disclosure.

FIG. 4 is a view illustrating an audio processing method according to a first exemplary embodiment of the present disclosure.

With reference to FIGS. 1 and 4 for better understanding, the audio processing apparatus 100 according to an exemplary embodiment of the present disclosure determines an initialization mode for processing the audio signal provided from the audio provision apparatus 100, and performs the initialization process differently according to the result of determination (S400).

After the initialization process according to the initialization mode is performed, the audio processing apparatus 110 processes the input audio signal and outputs the processed audio signal (S410).

The aforementioned operations S400 and S410 were explained in detail hereinabove and thus further explanation is omitted.

Figure 5:
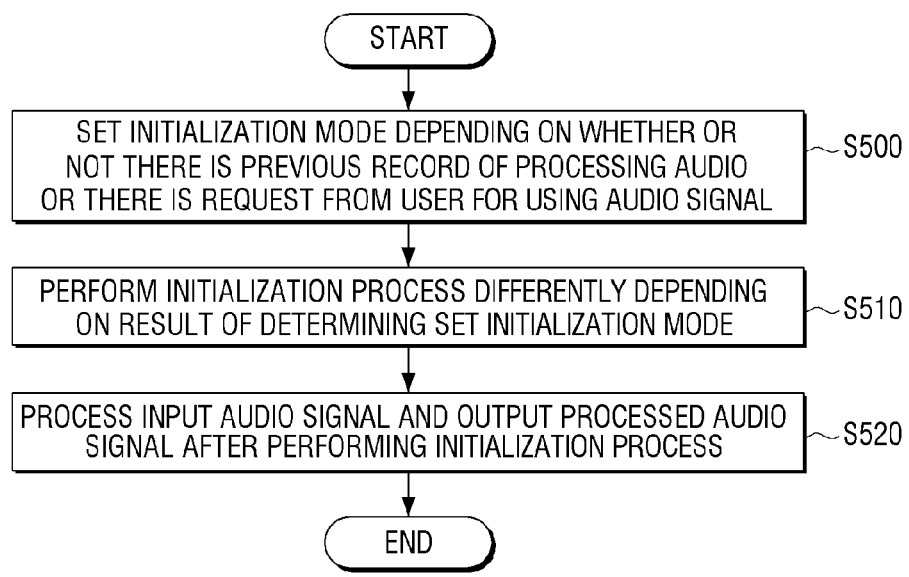
FIG. 5 is a view illustrating an audio processing method according to a second exemplary embodiment of the present disclosure.

FIG. 5 is a view illustrating an audio processing method according to a second exemplary embodiment of the present disclosure.

With reference to FIGS. 1 and 5, the audio processing apparatus 110 according to an exemplary embodiment of the present disclosure sets an initialization mode for audio signal processing according to the previous condition of the audio processing apparatus 110, or the signal type of the audio signal provided from the audio provision apparatus 100 that is operating (S400).

Setting an initialization mode involves determining a normal mode, ARC mode and optical/coaxial mode and setting the GPIO based on the determined mode according to whether the user intends to stop using a web browser and then to reuse it again, or whether or not there has been input a particular key such as a sound key, under a particular operation condition, that is, with a voltage applied to the MICOM 300_1 of FIG. 3 at the user's request.

This setting of the GPIO according to an exemplary embodiment of the present disclosure may be made by an on/off control of two GPIO terminals, wherein the normal mode may be set to "High, High", and the ARC mode may be set to "Low, High", and the optical/coaxial mode may be set to "High, Low", respectively. Of course, such a setting process may be changed as much as possible.

Next, the audio processing apparatus 110 performs an initialization process differently according to the result of determination of the set initialization mode (S410). Herein, to perform an initialization process differently means adjusting (or changing) the initializing order of the apparatus, according to which the initializing time of each mode may change.

More specifically, when the CPU 300_2 of FIG. 3 is being turned on, the audio processing apparatus 110 initializes what is necessary to drive the system, reads the GPIO provided from the MICOM 300_1, and determines a particular mode. To this end, the CPU 300_2 first compares the GPIO with the condition of the ARC mode, and if it is not an ARC mode, the CPU 300_2 compares the GPIO with the condition of an optical/coaxial mode again, to perform an initialization process corresponding to each mode. In other words, such a comparison process is a process of determining whether both terminals are turned on or only one terminal is turned off, and if one terminal is turned off, which terminal is turned off.

Next, the audio processing apparatus 110 performs an initialization process corresponding to a particular mode, and then processes the input audio signal and outputs the processed audio signal (S410). In other words, the audio processing apparatus 110 may decompress the compressed audio signal and perform a signal conversion etc. to output the decompressed audio signal to each path in order to output the audio signal in multi channel path.

Figure 6:
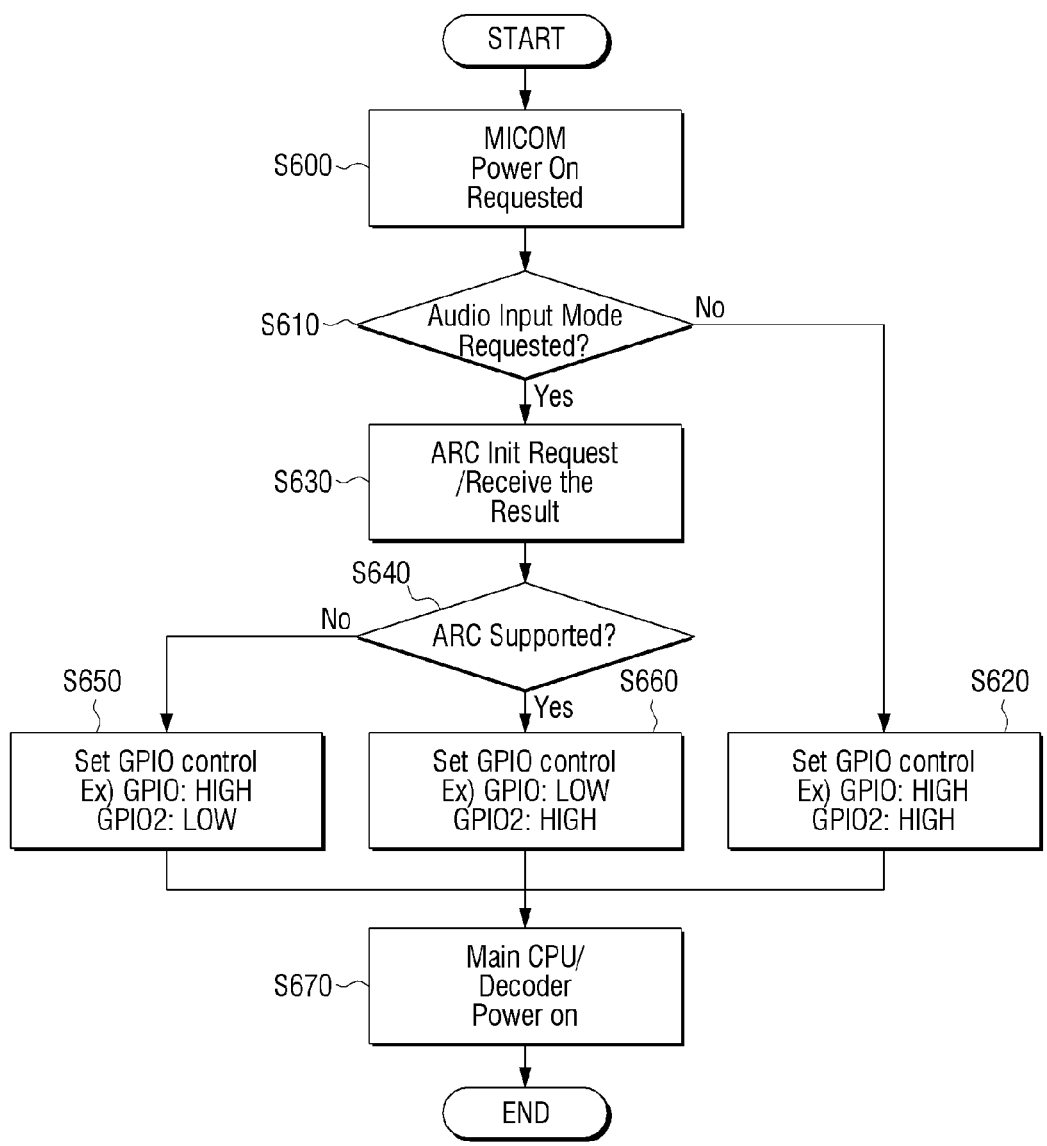
FIG. 6 is a flowchart illustrating a process for setting an initialization mode of a Microcomputer (MICOM) illustrated in FIG. 3.

FIG. 6 is a flowchart illustrating a process of setting an initialization mode of a MICOM illustrated in FIG. 3. The MICOM 300_1 according to an exemplary embodiment of the present disclosure may receive a voltage from outside and be turned on at a user's request (S600).

Next, the MICOM 300_1 determines the previous condition of the audio processing apparatus 110 to determine whether a web browser etc. was used previously, or whether there was an input of a particular key such as a sound key etc. for requesting ARC and optical/coaxial signal from the user (S610), and in the former case, sets the GPIO regarding the general mode (S620).

But in the latter case, that is, when it is determined that there was an input of a particular key input for an audio signal, it is possible to inquire whether or not it is an ARC signal to the audio provision apparatus 100 of FIG. 1(S630), and determine the response (S640).

If at S640, it is determined that it is possible to support ARC, the MICOM 300_1 sets the GPIO regarding the optical/coaxial mode (S650).

For example, if at S640, it is determined that it is possible to support ARC, the MICOM 300_1 sets the GPIO regarding the ARC mode (S660).

Next, the MICOM 300_1 controls power applied to the CPU 300_2 and decoder 310_2 of FIG. 3, so that the power is applied (S670).

Meanwhile, in an exemplary embodiment of the present disclosure, at S630, an inquiry is made to the audio provision apparatus 100 whether or not the audio signal is an ARC signal, but at this step, inquiring whether or not the audio signal is an optical/coaxial signal is also possible, and thus there is no limitation thereto.

Figure 7:
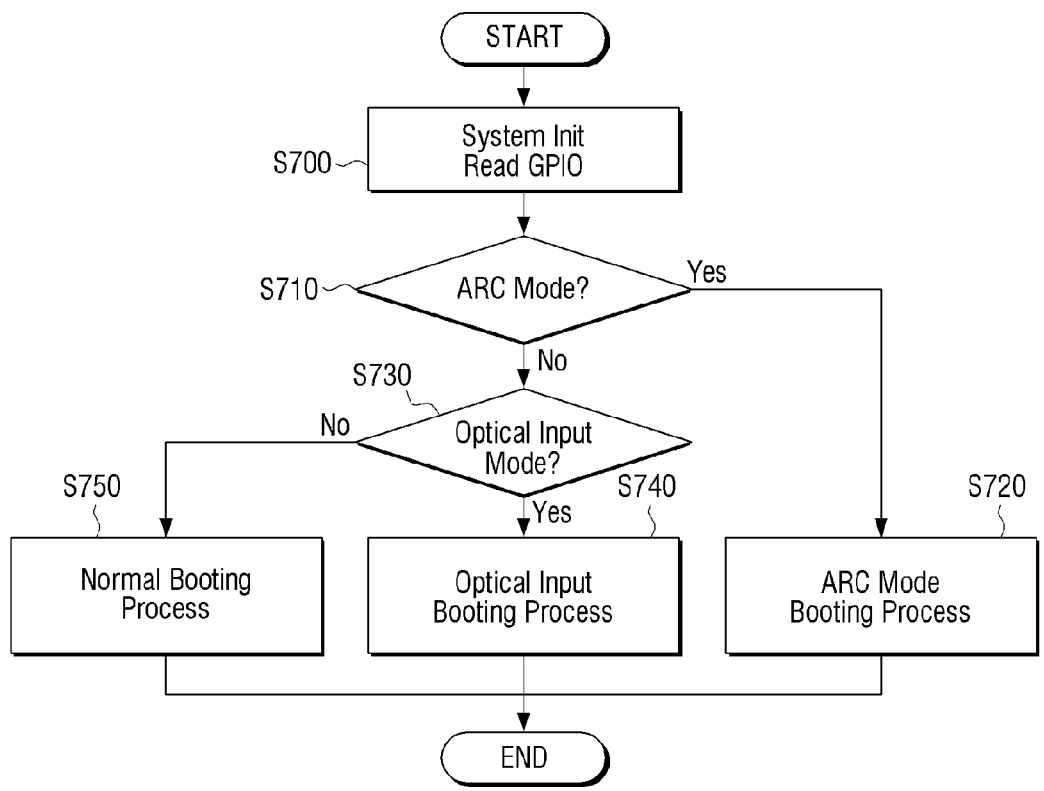
FIG. 7 is a view illustrating an initialization operation of a CPU illustrated in FIG. 3.

FIG. 7 is a view illustrating an initialization operation of a CPU illustrated in FIG. 3.

With reference to FIGS. 3 and 7, the CPU 300_2 according to an exemplary embodiment of the present disclosure is turned on according to the power applied, initializes what is necessary to drive the system, and then checks the GPIO condition provided from the MICOM 300_1 (S700).

Next, the CPU 300_2 determines whether or not the GPIO condition is for an ARC mode, for example, whether the terminal of the two GPIO 1 and 2 are under a low and high condition, respectively, and if so, performs an initialization process corresponding to the ARC mode (S710, S720).

If, as a result of comparison, it is not an ARC mode, the CPU determines whether it is a condition regarding an optical/coaxial mode (S730), and if so, performs an initialization process corresponding to the optical/coaxial mode (S740), but if not, performs an initialization process corresponding to the normal mode (S750).

Meanwhile, the order of comparing which mode the condition corresponds to may be changed as much as possible, and thus there is not limitation to the aforementioned order of comparison.

Meanwhile, just because it was described that all the configurative elements forming an exemplary embodiment of the present disclosure are integrated into one element or operate as such, there is no limitation thereto. That is, as long as it is within the scope of the purpose of the present disclosure, at least one of all those configurative elements may be selectively combined to one another and operate. Furthermore, each of all those configurative elements may be embodied as one independent hardware, but a part or entirety of those configurative elements may also be selectively combined and be embodied as a computer program having a program module that performs a part or entirety of functions combined in one or a plurality of hardware. Codes that form that computer program and the code segments thereof may be easily derived by those skilled in the art. Such a computer program may be stored in a non-transitory computer readable media and be read and executed by the computer, thereby embodying an exemplary embodiment of the present disclosure Herein, a non-transitory computer readable medium refers to a computer readable medium where data can be stored semi-permanently and not a medium that stores data for a short period of time such as a resister, cache, and memory etc. More specifically, the aforementioned various applications or programs may be stored in and provided by non-transitory computer readable medium such as CD, DVD, hard disk, blue-ray disk, USB, memory card, and ROM etc.

Although a few embodiments of the present invention have been shown and described, it would be appreciated by those skilled in the art that changes may be made in this embodiment without departing from the principles and spirit of the invention, the scope of which is defined in the claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An audio processing apparatus, comprising:
a signal receiver configured to receive a video signal and an audio signal from an external apparatus;
an audio processor configured to process the audio signal received from the external apparatus and output the processed audio signal, after an initialization process of the audio processor is performed,
a video processor configured to process the video signal received from the external apparatus and output the processed video signal, after an initialization process of the video processor is performed; and
a controller configured to determine, based on information received from the external apparatus, whether to first perform the initialization process of the audio processor or first perform the initialization process of the video processor, and initialize first one of the audio processor and the video processor according to the determination.

2. The audio processing apparatus according to claim 1, wherein the controller determines an initialization mode as being one of a normal mode where the video signal is processed prior to the audio signal and a non-normal mode where the audio signal is processed prior to the video signal, and, corresponding to the determined initialization mode, performs one of the initialization process of the audio processor or the initialization process of the video processor.

3. The audio processing apparatus according to claim 2, wherein the non-normal mode comprises a High Definition Multimedia Interface (HDMI) Audio Return Channel (ARC) mode for receiving an input of the audio signal from the external apparatus through a HDMI (ARC) and an optical/coaxial input mode for receiving an input of the audio signal from the external apparatus through an optical/coaxial cable.

4. The audio processing apparatus according to claim 1, wherein the controller comprises:
a first controller configured to set an initialization mode according to a user's request; and
a second controller configured to perform an initialization process corresponding to the set initialization mode.

5. The audio processing apparatus according to claim 4, wherein the first controller sets the initialization mode to a normal mode for the first performing the initialization process of the video processor for processing the video signal prior to the audio signal when there exists a video processing history of the audio processing apparatus.

6. The audio processing apparatus according to claim 5, wherein the first controller inquires about a signal mode of the audio signal to the external apparatus, when there exists a user's request and sets the initialization mode to an HDMI ARC mode or optical/coaxial input mode for processing the audio signal prior to the video signal according to whether or not there is a response to the inquiry.

7. The audio processing apparatus according to claim 6, wherein the first controller and the second controller are connected through a General Purpose Input/Output (GPIO) terminal, and
the first controller sets the initialization mode to one of a High Definition Multimedia Interface Auto Return Channel mode and optical/coaxial input mode by controlling the GPIO terminal.

8. The audio processing apparatus according to claim 7, wherein the first controller applies power to the second controller and the audio processor together with controlling the GPIO terminal.

9. The audio processing apparatus according to claim 1, wherein the audio processor comprises:
a decoder for decoding the audio signal; and
a signal transceiver for receiving the audio signal from the external apparatus,
wherein the signal transceiver comprises:
a first connector configured to receive an audio signal of the external apparatus through an HDMI ARC; and
a second connector configured to receive an audio signal of the external apparatus through an optical/coaxial cable.

10. An audio processing method of an audio processing apparatus, the method comprising:

receiving video and audio signal from an external apparatus;

processing the audio signal received from the external apparatus and outputting the processed audio signal after an initialization process of the audio processor is performed, processing the video signal received from the external apparatus and output the processed video signal, after an initialization process of the video processor is performed; and determining, based on information received from the external apparatus, whether to first initialize the audio processor or first initialize the video processor, and initialize first one of the audio processor and the video processor according to the determination.

11. The audio processing method according to claim 10, wherein the determining involves determining an initialization mode as one of a normal mode where the video signal is processed prior to the audio signal and an non-normal mode where the audio signal is processed prior to the video signal.

12. The audio processing method according to claim 11, wherein the non-normal mode comprises an HDMI ARC mode for receiving an input of the audio signal from the external apparatus through a HDMI ARC (Audio Return Channel) and an optical/coaxial input mode for receiving an input of the audio signal from the external apparatus through an optical/coaxial cable.

13. The audio processing method according to claim 10, further comprising:

setting, by a first controller, an initialization mode according to a user's request; and performing, by a second controller, one of the initialization process of the video processor and the initialization process of the video processor, which corresponds to the set initialization mode.

14. The audio processing method according to claim 13, wherein the setting the initialization mode involves setting the initialization mode to a normal mode for processing the video signal prior to the audio signal, when there exists a video processing history with the first controller turned on.

15. The audio processing method according to claim 13, wherein the setting the initialization mode comprises:

inquiring about a signal mode of the audio signal to the external apparatus at the user's request; and setting the initialization mode to an HDMI ARC mode or optical/coaxial input mode for processing the audio signal prior to the video signal according to whether or not there is a response to the inquiry.

16. The audio processing method according to claim 15, wherein the first controller and the second controller are connected through a GPIO (General Purpose Input/Output) terminal, and the setting the initialization mode involves setting the initialization mode to one of the normal mode, HDMI ARC mode, and optical/coaxial input mode by controlling the GPIO terminal by the first controller.

17. The audio processing method according to claim 16, wherein the performing the initialization process involves checking a condition of control of the GPIO terminal and determining the initialization mode.

18. The audio processing method according to claim 16, wherein the performing the initialization process comprises controlling so that power is applied to the second controller and audio processor together with controlling the GPIO terminal.

19. A method for setting an initialization mode, the method comprising:

starting an operation at a user's request;

determining whether or not there exists at least one of a video processing history and a user's request;

inquiring about a signal mode of an audio signal to an audio provision apparatus, if there is a user's request for using the audio signal; and setting an initialization mode according to a response, if there is a response to the inquiry from the audio provision apparatus, wherein the initialization mode has an order of booting configurative elements within an audio processing apparatus responsive to the initialization mode.

20. The method for setting an initialization mode, according to claim 19 further comprising setting the initialization mode to a normal mode for processing the video signal prior to the audio signal, if there exists the video processing history.

21. The method for setting an initialization mode according to claim 20, wherein the setting the initialization mode comprises:

distinguishing between an High Definition Multimedia Interface (HDMI) Audio Return Channel (ARC) mode for processing the audio signal prior to the video signal or an optical/coaxial input mode according to whether or not there is a response to the inquiry; and setting the initialization mode according to a result of the distinguishing.

22. The method for setting an initialization mode according to claim 21, wherein the initialization mode involves setting the initialization mode to one of the normal mode, HDMI ARC mode, and optical/coaxial input mode by controlling a General Purpose Input/Output terminal.

23. A non-transitory computer-readable recording medium for executing a method for setting an initialization mode of an audio processing apparatus, the recording medium executing:

determining whether or not there exists at least one of a video processing history and user's request; and inquiring about a signal mode of an audio signal to an audio provision apparatus, if there is a user's request for using the audio signal; and setting an initialization mode according to a response, if there is a response to the inquiry from the audio provision apparatus, wherein the initialization mode has an order of booting configurative elements within the audio processing apparatus responsive to the initialization mode.

24. The audio processing apparatus according to claim 2, wherein an initialization mode relates to at least one of the initialization process of the audio processor and the initialization process of the video processor, and wherein the controller determines the initialization mode using a type of the audio signal.

25. The audio processing apparatus according to claim 2, wherein an initialization mode relates to at least one of the initialization process of the audio processor and the initialization process of the video processor, and wherein the controller determines the initialization mode using a previous condition of an audio processing apparatus.

26. The audio processing method according to claim 11, wherein an initialization mode relates to at least one of the initialization process of the audio processor and the initialization process of the video processor, and wherein the determining determines the initialization mode using a type of the audio signal.

27. The audio processing method according to claim 11, wherein an initialization mode relates to at least one of the initialization process of the audio processor and the initialization process of the video processor, and wherein the determining determines the initialization mode using a previous condition of an audio processing apparatus.

* * * * *